(12) United States Patent
Christiansen

(10) Patent No.: US 11,506,637 B2
(45) Date of Patent: Nov. 22, 2022

(54) TEST ARRANGEMENT AND METHOD FOR FATIGUE TESTING A WIND TURBINE BLADE

(71) Applicant: Siemens Gamesa Renewable Energy A/S, Brande (DK)

(72) Inventor: Soeren Christiansen, Stoevenring (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 41 days.

(21) Appl. No.: 17/144,873

(22) Filed: Jan. 8, 2021

(65) Prior Publication Data

US 2021/0215644 A1 Jul. 15, 2021

(30) Foreign Application Priority Data

Jan. 13, 2020 (EP) ..................................... 20151491

(51) Int. Cl.
*G01N 29/12* (2006.01)
*G01N 29/22* (2006.01)

(52) U.S. Cl.
CPC ........... *G01N 29/12* (2013.01); *G01N 29/223* (2013.01)

(58) Field of Classification Search
None
See application file for complete search history.

(56) References Cited

U.S. PATENT DOCUMENTS

| 8,631,704 | B2 | 1/2014 | Guy | |
| 2002/0083772 | A1* | 7/2002 | Sonnichsen | G10K 11/161 |
| | | | | 73/660 |
| 2009/0173148 | A1* | 7/2009 | Jensen | F03D 17/00 |
| | | | | 73/116.03 |
| 2011/0179884 | A1* | 7/2011 | Guy | G01M 7/04 |
| | | | | 73/862.381 |
| 2016/0061688 | A1* | 3/2016 | Van Wittenberghe | ...................... |
| | | | | G01M 5/0041 |
| | | | | 73/577 |
| 2016/0109325 | A1* | 4/2016 | Lee | G01M 7/027 |
| | | | | 702/56 |

FOREIGN PATENT DOCUMENTS

WO 2009097049 A2 8/2009

OTHER PUBLICATIONS

Jung, Jae Hwan, et al., "Effect of natural frequency modes on sloshing phenomenon in a rectangular tank" Int. J. Nav Archit. Ocean Eng. (2015) 7; pp. 580-594; 15 pages.
Extended European Search Report in related European Patent Application No. 20151491.6 dated Jul. 21, 2020. 8 pages.

* cited by examiner

Primary Examiner — Raul J Rios Russo
Assistant Examiner — Carl F. R. Tchatchouang
(74) Attorney, Agent, or Firm — Schmeiser, Olsen & Watts LLP

(57) ABSTRACT

A test arrangement for fatigue testing a wind turbine blade, including a floor-mounted test rig having a fixing device for fixing the wind turbine blade to the test rig and an excitation assembly for exciting the wind turbine blade at a test frequency, wherein the test rig includes a liquid tank having a chamber containing a predefined liquid, wherein the liquid in the liquid tank has a resonance frequency depending on the amount of liquid in the liquid tank and the chamber geometry is provided.

12 Claims, 4 Drawing Sheets

TEST ARRANGEMENT AND METHOD FOR FATIGUE TESTING A WIND TURBINE BLADE

CROSS-REFERENCE TO RELATED APPLICATIONS

This application claims priority to European Patent Application No. 20151491.6, having a filing date of Jan. 13, 2020, the entire contents of which are hereby incorporated by reference.

FIELD OF TECHNOLOGY

The following relates to a test arrangement for fatigue testing a wind turbine blade, including a floor-mounted test rig having a fixing device for fixing the wind turbine blade to the test rig and an excitation assembly for exciting the blade at a test frequency. The following further relates to a method for fatigue testing a wind turbine blade.

BACKGROUND

Wind turbine blades, which have to withstand strong forces and loads during use in the wind turbine, have to be tested before employing them in an actual wind turbine installation. Testing methods for whole wind turbines usually at least comprise a so-called static testing, wherein a static load is applied to the wind turbine blade, and fatigue testing, wherein the blade is excited at a test frequency, which is usually equal or close to a resonance frequency of the blade, for many cycles, for example more than one million cycles.

Test arrangements for fatigue testing usually comprise a test rig to which the wind turbine blade is fixed. The test rig may also be called test bench, test stand, or blade support.

The test rig is a massive structure and often comprises a main body made of a high-density material, for example concrete, steel and/or lead. On the other hand, an excitation assembly for exciting the wind turbine blade at the test frequency is placed spaced apart from the test rig to excite the blade, wherein multiple concrete methods for exciting a wind turbine blade have already been proposed in the state of the art. When exciting the wind turbine blade, the tip oscillates at high amplitudes, so that corresponding oscillation also occur at the blade root where the wind turbine blade is fixed to the test rig.

The test rig hence has to be designed to withstand the forces and loads resulting form these oscillations of the blade root. In known test arrangements, the large moments at the blade root are transferred through the test rig and into the ground/floor. Hence, a solid, robust test rig is required.

U.S. Pat. No. 8,631,704 B2 discloses a fatigue testing device for wind turbine blade testing, in particular a fatigue exciter for wind turbine blades. During excitation using an actuator 1, the wind turbine blade itself is fixed in a test bench 20 which is carried on the ground. The test bench 20 thus corresponds to a test rig.

Since large moments and strong forces, creating excessive loads, have to be absorbed by the test rig and transferred to the ground, test rigs are constructed as large, heavy and expensive structures. Usually, test rigs are designed to withstand the loads occurring during testing of a certain wind turbine blade, in particular a wind turbine blade of a certain size/length, since loads on the blade support increase with increasing blade length. However, currently, wind turbines having longer blades are developed, such that existing test arrangements, in particular the test rigs, may not be able to handle the loads occurring during fatigue testing of these longer wind turbine blades. New, expensive test arrangements would have to be constructed, sometimes taking up to a year from decision to completion.

SUMMARY

An aspect of the embodiment of the present invention to reduce the requirements for test rigs of test arrangements for fatigue testing of wind turbine blades and/or to allow using test rigs designed for smaller, in particular shorter, wind turbine blades also for larger, in particular longer, wind turbine blades.

An aspect relates to providing a test arrangement and a method for fatigue testing a wind turbine blade.

In a test arrangement as initially described, according to the embodiment of the present invention, the test rig comprises a liquid tank having a chamber containing a predefine liquid, wherein the liquid in the liquid tank has a resonance frequency depending on the amount of liquid in the tank and the chamber geometry. The liquid tank may be understood as or as a part of a damping device for damping oscillations of the wind turbine blade introduced into the test rig.

The oscillations and thus moments introduced by the blade root of the wind turbine blade via the fixing device into the test rig excite the liquid in the chamber of the liquid tank, thereby dissipating energy.

This reduces the load on the test rig, such that, for example, the design requirements for the test rigs may be reduced and large new wind turbine blades may be fatigue tested on existing test rigs that were designed for smaller wind turbine blades, such that the cost and time of building a new test rig is saved.

To achieve optimal energy dissipation and thus damping, the amount of liquid and the chamber geometry are chosen or can be choses such that the resonance frequency of the liquid is at least essentially equal to the test frequency. In other words, the liquid tank and the amount of liquid in the liquid tank may be designed in such a way that the liquid will resonate at the test frequency. Since, however, the test frequency and/or frequency to be damped may change, even during a single test, for example due to blade wear and/or change of temperature, it is, as laid out in more detail below, to provide an actuating device to change the resonance frequency of the liquid in the chamber.

It is, however, noted already at this point that the resonance frequency is not required to be equal to the test frequency to dissipate energy. While it is to design the liquid tank as stable and robust as possible, there may be embodiments in which certain power limitations of the liquid tank have to be taken into account. In such cases, the resonance frequency of the liquid in the chamber can deliberately be chosen to differ from the test frequency to take account of the power limitations.

The test rig may also be termed test stand, test bench, or blade support.

As known, the purpose of the fatigue test is to excite the wind turbine blade in particular at or close to its resonance frequency. This will cause large blade tip deflections and thus large blade root moments. These moments are usually absorbed by the test rig and transferred to the ground, since it is ground-mounted. By using a liquid tank with a resonant liquid, the load seen by the test rig and to be introduced into the ground will be reduced.

In especially advantageous embodiments, the test arrangement comprises an actuating device for adjusting the resonance frequency of the liquid, in particular a liquid amount adjusting device and/or a chamber geometry adjusting device. By changing the amount of liquid contained in the chamber and/or the chamber geometry, for example, by changing its length, the resonance frequency of the liquid in the chamber is also changed, such that can be adapted to other test frequencies. For example, if another blade, for example a newer, larger wind turbine blade, is to be fatigue tested using the test arrangement, the amount of liquid in the chamber, for example its filling level, may be adjusted so that the resonance frequency of the liquid in the chamber is at least essentially equal to the test frequency or, generally, a frequency to be damped, which usually depends on the test frequency. In other, less exemplary embodiments, it is also possible to change the chamber geometry. If a liquid amount adjusting device is used, it may, for example, comprise a liquid reservoir, at least one valve and/or at least one pump. The liquid amount adjusting device can in particular be designed so that a fully automatically adjustment of the amount of liquid housed in the chamber can be achieved. Regarding the chamber geometry adjusting device, it may, for example comprise moveable chamber walls and/or moveable elements, for example fins or the like. Independent of the concrete realization of the actuating device, it may be controllable by a control device.

In an exemplary embodiment, the test arrangement may thus comprise a control device adapted to control the actuating device such that the reference frequency of the liquid becomes at least essentially equal to the test frequency, or, generally, a frequency to be damped which depends on the test frequency. In this manner, an adaptable test arrangement usable for a large number of test frequencies is provided. In other words, the test arrangement having an actuation device can be understood as a "fit-for-purpose" test arrangement that can be adapted to various blade lengths. It is, however, also possible to adjust the resonance frequency of the liquid in real-time according to a changing test frequency during a fatigue test. For example, a test frequency may change due to wear of the wind turbine blade and/or temperature changes. It is noted that different modes may be subject to adjustment. For example, if the test frequency is equal to a first mode of flapwise excitation of the wind turbine blade, the resonance frequency of the liquid may also be chosen to be equal to the second mode flapwise frequency of the wind turbine blade.

Preferably, the control device may also control the excitation assembly. In this manner, currently used test frequencies are already known to the control device, such that automatically adjustment of the resonance frequency of the liquid in the chamber can be achieved, in particular over a wide range of test frequencies which may be chosen by an operator.

Generally speaking, according to the embodiment of the present invention, the excitation by the excitation assembly takes place at a distance from the test rig along the wind turbine blade, for example at a predetermined position spaced apart from the test rig along the blade. Any type of known excitation assemblies may be used in the test arrangement according to the present invention. This also applies to the fixing devices, which may, for example, comprise a flange or the like, in particular mimicking fixing devices at a rotor hub of a wind turbine where the wind turbine blade is to be employed.

The test rig may comprise an in particular massive main body mounted on the floor, in particular via a foundation. Such main bodies may comprise concrete and/or other, in particular high-density, materials, for example steel and/or lead. The main body may be placed on a foundation, which may itself be made, for example, from concrete or the like and may provide additional stability.

In an especially exemplary embodiment, the liquid tank may be mounted laterally to the main body and may comprise or be attached to the fixing device opposite to the main body. In this manner, the liquid tank is positioned between the main body and the blade. In other words, the blade, the liquid tank and the main body are attached to each other in series. In this manner, loads already dissipated to excite the liquid in the chamber of the liquid tank are not even transferred to the main body, such that an especially effective load relief for the main body is achieved. For example, long or short bolts may be used to attach the liquid tank at a side of the main body, which may have a plate, in particular a steel plate, attached to it to facilitate attaching the liquid tank, whereas the fixing device may be integrally formed in the liquid tank or attached to the liquid tank opposite to the main body.

In a less exemplary embodiment, the liquid tank may be mounted on top of the main body. Also, at this position, energy introduced into the main body may at least partly be dissipated by exciting the liquid in the chamber of the liquid tank. Of course, also other positions of the liquid tank are conceivable as long as the liquid in the chamber of the liquid tank is excitable by oscillations of the blade, thereby dissipating energy.

In concrete embodiments, the chamber may have a cuboidal or cylindrical form. A cuboidal form, that is, that of a rectangular box, as are other geometrically simple forms, since for such basic geometries, formulas linking the resonance frequency of the liquid in the chamber to the amount of liquid in the chamber and the chamber geometry are more easily derivable. For example, in a paper titled "Effect of natural frequency modes on sloshing phenomenon in a rectangular tank", by Jae Hwan Jung et al, Int. J. Nay. Archit. Ocean Eng. (2015) 7: 580-594, the authors describe how water in a rectangular chamber has a resonance frequency defined by gravity, water height, mode number and chamber length. They derive the following equation for the resonance frequency $f_n$ of the n-th mode $$f_n = \frac{1}{2\pi} \sqrt{\frac{n\pi g}{L} \tanh\left(\frac{n\pi h}{L}\right)}, \tag{1}$$

wherein g is the gravity constant, h is the height of the water in the liquid tank and L is the length of the cuboidal chamber. Of course, if other liquids than water are used in the chamber of the liquid tank, such formulas may have to be modified accordingly.

In particular in the exemplary embodiment, where the liquid tank is arranged between the fixing device and the main body, the liquid tank itself needs to be robust and withstand large loads, in particular moments introduced from the blade root. Preferably, the liquid tank may thus be made of steel and/or a fibre reinforced material.

The liquid may comprise water and/or oil and/or a material having a viscosity larger than 1 Pa*s, in particular slime. It is noted that also a mixture of multiple materials may be used. While, in some cases, highly viscous materials, for example slime, may be suitable, it has been shown that water resonance frequencies in a rectangular chamber of a length of up to a few meters meet many usual test frequencies for fatigue testing of wind turbine blades.

In advantageous embodiments, the test arrangement may comprise multiple liquid tanks and/or the liquid tank may comprise multiple chambers for different oscillation directions and/or test frequencies. While fatigue testing wind turbine blades, different test frequencies may be used, for example for different resonant modes and/or oscillation directions. To accommodate for those different test frequencies, multiple liquid tanks and/or at least one liquid tank having multiple chambers may be used. The liquid in each chamber or liquid tank, respectively, has a resonance frequency corresponding to one of the test frequencies.

The embodiment of the present invention further concerns a method for fatigue testing a wind turbine blade using a test arrangement according to the present invention, comprising the steps of
  choosing a test frequency for the wind turbine blade, in particular at least essentially
  matching a resonance frequency of the wind turbine blade,
  adjusting the amount of liquid in the chamber and/or the chamber geometry depending on the test frequency, in particular such that the resonance frequency of the liquid in the chamber is at least essentially equal to the test frequency, and
  exciting the wind turbine blade at the test frequency.

All features and remarks regarding the test arrangement also apply correspondingly to the method according to the embodiment of the present invention, such that the same advantageous may be achieved.

In particular, a cuboidal chamber for water as the liquid may be used, wherein the amount of water in the chamber is determined according to the equation (1) as already described above.

The method according to the embodiment of the present invention is executed fully automatically, in particular by the control device described above.

BRIEF DESCRIPTION

Some of the embodiments will be described in detail, with reference to the following figures, wherein like designations denote like members, wherein.

DETAILED DESCRIPTION

Figure 1:
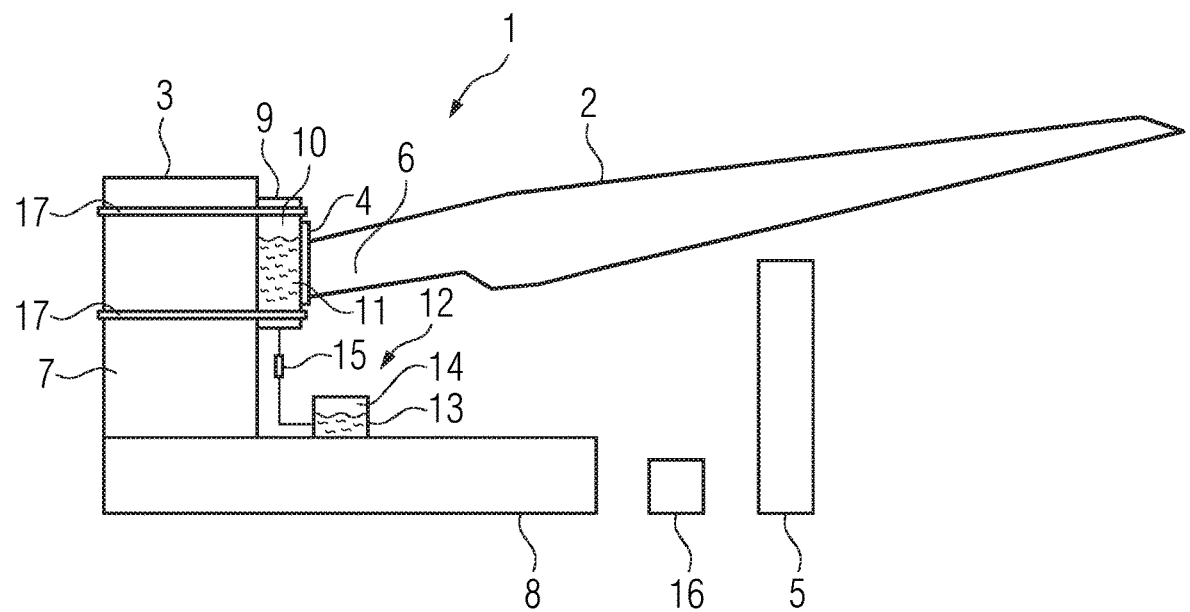
FIG. 1 depicts a schematical drawing of a first embodiment of a test arrangement.

FIG. 1 shows a first, an exemplary embodiment of a test arrangement according to the embodiment of the present invention. The test arrangement 1 is adapted for fatigue testing of a wind turbine blade 2 also indicated in FIG. 1, but not forming part of the test arrangement 1.

The test arrangement 1 includes a test rig 3 to which the wind turbine blade 2 may be fixed via a fixing device 4, for example a flange having the same fixing means as a rotor hub of a wind turbine where the wind turbine blade 2 can be employed. The test arrangement 1 further includes an excitation assembly 5 only schematically shown, which is adapted to excite the wind turbine blade 2 using a test frequency, which may be equal or close to a resonance frequency of the wind turbine blade 2, at a position away from the ground-mounted test rig 3. The test rig 3 is thus unmoveable and fixed to the floor so that moments introduced from the blade route 6 are at least partly transferred to the ground via the test rig 3.

The test rig 3 includes a main body 7 made of concrete, which may optionally be attached to a foundation 8 also made of concrete. However, the fixing means 4 in this first embodiment is not directly mounted on the main body 7, but a liquid tank 9 defining a chamber 10 containing a liquid 11, in this case water, is mounted between the fixing device 4 and the main body 7. The liquid tank 9 can be understood as a damping device, since moments introduced from the blade root 6 via the fixing device 4 due to oscillations of the wind turbine blade 2 excite the liquid 11 inside the chamber 10. Hence, energy is dissipated and less load is exerted onto the main body 7, since the blade root 6, the fixing device 4, the liquid tank 9 and the main body 7 are arranged in series.

Figure 3:
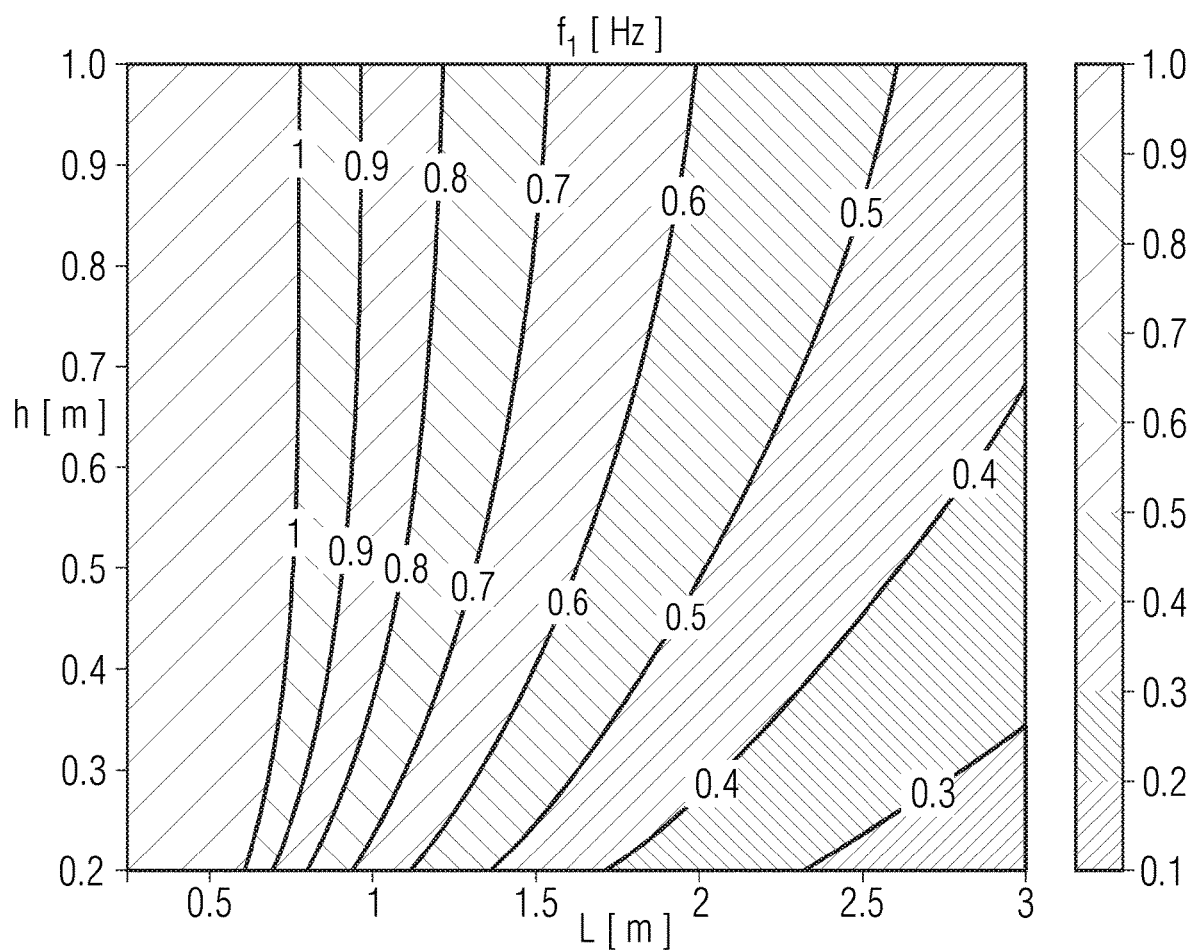
FIG. 3 depicts a graph showing resonance frequencies of water depending on its amount and chamber geometry.

In the embodiment of FIG. 1, the resonance frequency of the liquid 11 in the chamber 10 is adaptable to the test frequency used by the excitation assembly 5. In particular, in this embodiment, the chamber 10 is a cuboid, that is, a rectangular box. The resonance frequency of water as the liquid 11 in the chamber 10 depends on the chamber geometry, in particular its length L, and the amount of liquid 11, in this case the height h of the water inside the chamber 10, according to the above-discussed formula (1). The graph of FIG. 3 shows the frequency $f_1$ depending on h and L. As can be seen, the resonance frequencies of the liquid 11 in the chamber 10 have values also typical for test frequencies used for fatigue testing blades 2.

While it is in principle conceivable to have a predetermined amount of water and a predetermined chamber geometry adapted to a certain test frequency employed for fatigue testing of wind turbine blades 2 of a certain size, in particular length, in this embodiment, an actuating device 12 comprising a liquid amount adjusting device 13 is provided. The liquid amount adjusting device 13 includes a reservoir 14 for water, a pump 15 and valves which are not shown in FIG. 1 for simplicity. Using the actuating device 12, the amount of water in the chamber 10 can be configured such that a certain resonance frequency of the water in the chamber 10 results, which is at least essentially equal to a test frequency used, but may also, for example, relate to other modes of the wind turbine blade 2. To allow this kind of adaption to a wind turbine blade 2 to be tested, the test arrangement 1 also includes a control device 16 adapted to control the excitation assembly 5 as well as the actuating device 12. Since the test frequency used by the excitation assembly 5 is therefore known to the control device 16, the actuation device 12, in particular the liquid amount adjusting device 13, can be controlled to adapt the amount of liquid 11 in the chamber 10 such that the resonance frequency of the liquid 11 is at least essentially equal to the test frequency used by the excitation assembly 5, or equal to another frequency to be damped. The amount of water can, for example, be determined according to formula (1).

Figure 2:
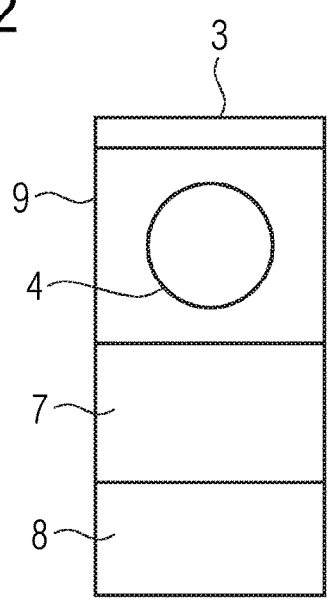
FIG. 2 depicts a frontal view of the test rig of the test arrangement of FIG. 1.

In the embodiment shown in FIGS. 1 and 2, the liquid tank 9 is made of steel and secured to the main body 7 by bolts 17. In the figures, long bolts 17 are shown, however, shorter bolts 17 may also be used. A thick steel plate (not shown) attached to the main body 7 may be used as an attachment aid for the liquid tank 9. In this manner, a stable, robust construction is achieved.

Figure 4:
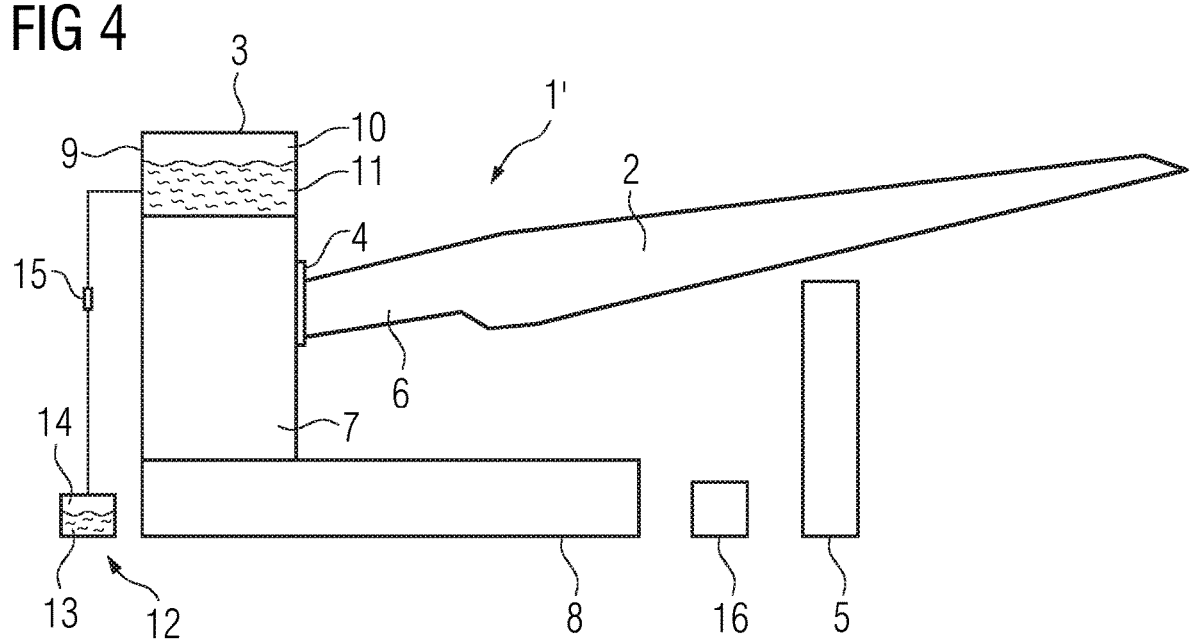
FIG. 4 depicts a schematical drawing of a second embodiment of a test arrangement.
Figure 5:
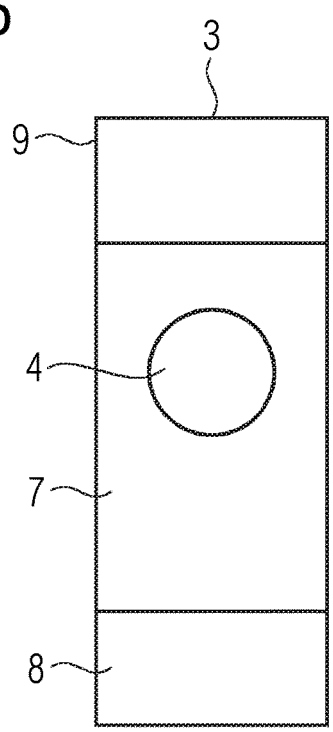
FIG. 5 depicts a frontal view of the test rig of the test arrangement according to FIG. 4.

FIGS. 4 and 5 show a modified second embodiment of a test arrangement 1 according to the embodiment of the present invention. In this case, the fixing device 4 is directly attached to the main body 7, wherein the liquid tank 9 is arranged on top of the main body 7. In this embodiment, the load received from the blade root 6 of the wind turbine blade 2 steal acts on the main body 7 before being reduced by exciting the liquid 11 in the liquid tank 9.

Figure 6:
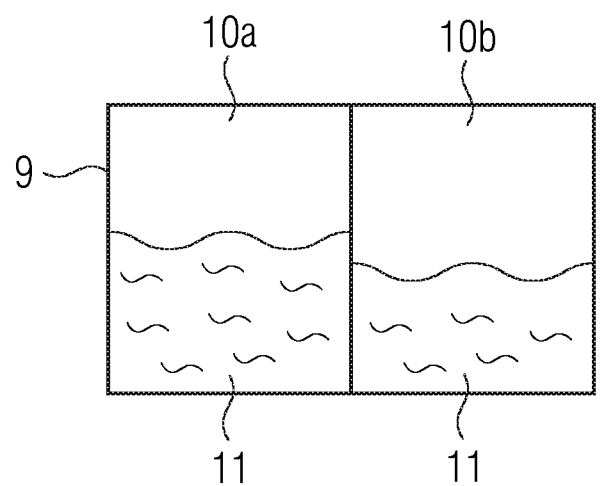
FIG. 6 depicts a liquid tank having two chambers.

In the case that two or more test frequencies are used, for example for exciting the wind turbine blade 2 in two different modes, a liquid tank construction as shown in FIG. 6 may be used. The liquid tank 9 in FIG. 6 includes two chambers 10a, 10b, both containing a certain amount of liquid 11 and having a chamber geometry such that one of the test frequencies is, for example, matched by the resonance frequencies of the liquid 11 in the respective chamber 10a, 10b. In this case, for example, an actuation device 12 may be associated with each chamber 10a, 10b, so that both resonance frequencies of the respective liquid 11 may be adjusted.

It is noted that the chamber 10, 10a, 10b may have different geometrical shapes in other embodiments, for example a cylindrical shape. Further, the liquid 11 used can also be or includes another material, for example oil or slime. It is finally noted that the actuating device 12 may also include a chamber geometry adjusting device such that the resonance frequency of the liquid 11 may also be adjusted by changing the chamber geometry, for example the length L.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A test arrangement for fatigue testing a wind turbine blade, comprising:
    a floor-mounted test rig having a fixing device for fixing the wind turbine blade to the floor-mounted test rig; and
    an excitation assembly for exciting the wind turbine blade at a test frequency;
    wherein the floor-mounted test rig comprises a liquid tank having a chamber containing a predefined liquid, the predefined liquid in the liquid tank having a resonance frequency depending on an amount of predefined liquid in the liquid tank and a chamber geometry.

2. The test arrangement according to claim 1, further comprising an actuating device for adjusting the resonance frequency of the predefined liquid, the actuating device being a liquid amount adjusting device and/or a chamber geometry adjusting device, wherein the amount of predefined liquid and the chamber geometry are chosen such that the resonance frequency of the predefined liquid is at least essentially equal to the test frequency.

3. The test arrangement according to claim 2, further comprising a control device configured to control the actuating device such that the resonance frequency of the predefined liquid becomes at least essentially equal to the test frequency.

4. The test arrangement according to claim 1, wherein the floor-mounted test rig comprises a massive main body mounted on a floor via a foundation.

5. The test arrangement according to claim 4, wherein the liquid tank is mounted laterally to the main body and comprises or is attached to the fixing device opposite to the main body.

6. The test arrangement according to claim 4, wherein the liquid tank is mounted on top of the main body.

7. The test arrangement according to claim 1, wherein the chamber has a cuboidal or cylindrical form and/or that the liquid tank is made of steel and/or a fibre reinforced material.

8. The test arrangement according to claim 1, wherein the predefined liquid comprises water and/or oil and/or a material having a viscosity larger than 1 Pa*s.

9. The test arrangement according to claim 1, further comprising additional liquid tanks and/or the liquid tank comprises multiple chambers for different oscillation directions and/or test frequencies.

10. A method for fatigue testing a wind turbine blade using a test arrangement according to claim 1, the method comprising:
    choosing the test frequency for the wind turbine blade that at least essentially matches the resonance frequency of the wind turbine blade;
    adjusting the amount of the predefined liquid in the chamber and/or the chamber geometry depending on the test frequency such that the resonance frequency of the predefined liquid in the chamber is at least essentially equal to the test frequency; and
    exciting the wind turbine blade at the test frequency.

11. The method according to claim 10, wherein that a cuboidal chamber for water as the predefined liquid is used, wherein the amount of water in the chamber is determined according to the equation $$f_n = \frac{1}{2\pi}\sqrt{\frac{n\pi g}{L}\tanh\left(\frac{n\pi h}{L}\right)},$$

wherein $f_n$ is the resonance frequency of the n-th mode, g is the gravity constant, h is the height of the water in the liquid tank and L is the length of the cuboidal chamber.

12. The test arrangement according to claim 1, wherein the liquid tank is a damping device for damping oscillations of the wind turbine blade introduced into the test rig.

* * * * *